DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 1, 1974

918 O.G. 104

T918,005

TRACTABLE AROMATIC POLY(SCHIFF BASES)

William P. Baker, Jr., deceased, late of Chadds Ford, Pa., by Sara Z. Baker, executrix, Chadds Ford, Pa., and Ronald A. Sahatjian, Chadds Ford, Pa.; said Sahatjian assignor to E. I. du Pont de Nemours and Company, Wilmington, Del.

Continuation of application Ser. No. 186,406, Oct. 4, 1971. This application Apr. 12, 1973, Ser. No. 350,644

Int. Cl. C08g *9/06*

U.S. Cl. 260—72.5

No Drawing. 11 Pages Specification

A tractable, aromatic poly(Schiff base) having the recurring structural formula:

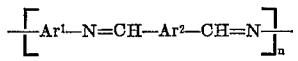

wherein $Ar^1$ is selected from

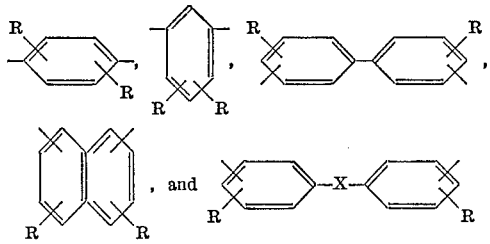

wherein R is independently selected from H, Cl, Br and Q, Q being alkyl of 1 to 3 carbon atoms, and X is selected from O, S, $\overset{O}{\overset{\|}{C}}$, $SO_2$ and alkylene of 1 to 3 carbon atoms; wherein $Ar^2$ is selected from

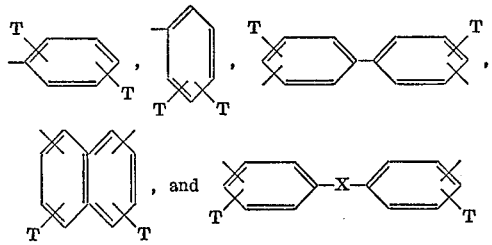

wherein T is independently selected from H, OH, OQ, Q, Cl and Br, and wherein X and Q are as defined above; and *n* is high enough to provide a film-forming molecular weight, the polymer having an inherent viscosity of at least about 0.2 and being substantially free from cross-linking.